No. 650,693. Patented May 29, 1900.
F. L. SHALER.
GYRATORY BOLTING MACHINE.
(Application filed Nov. 29, 1899.)
(No Model.) 10 Sheets—Sheet 1.
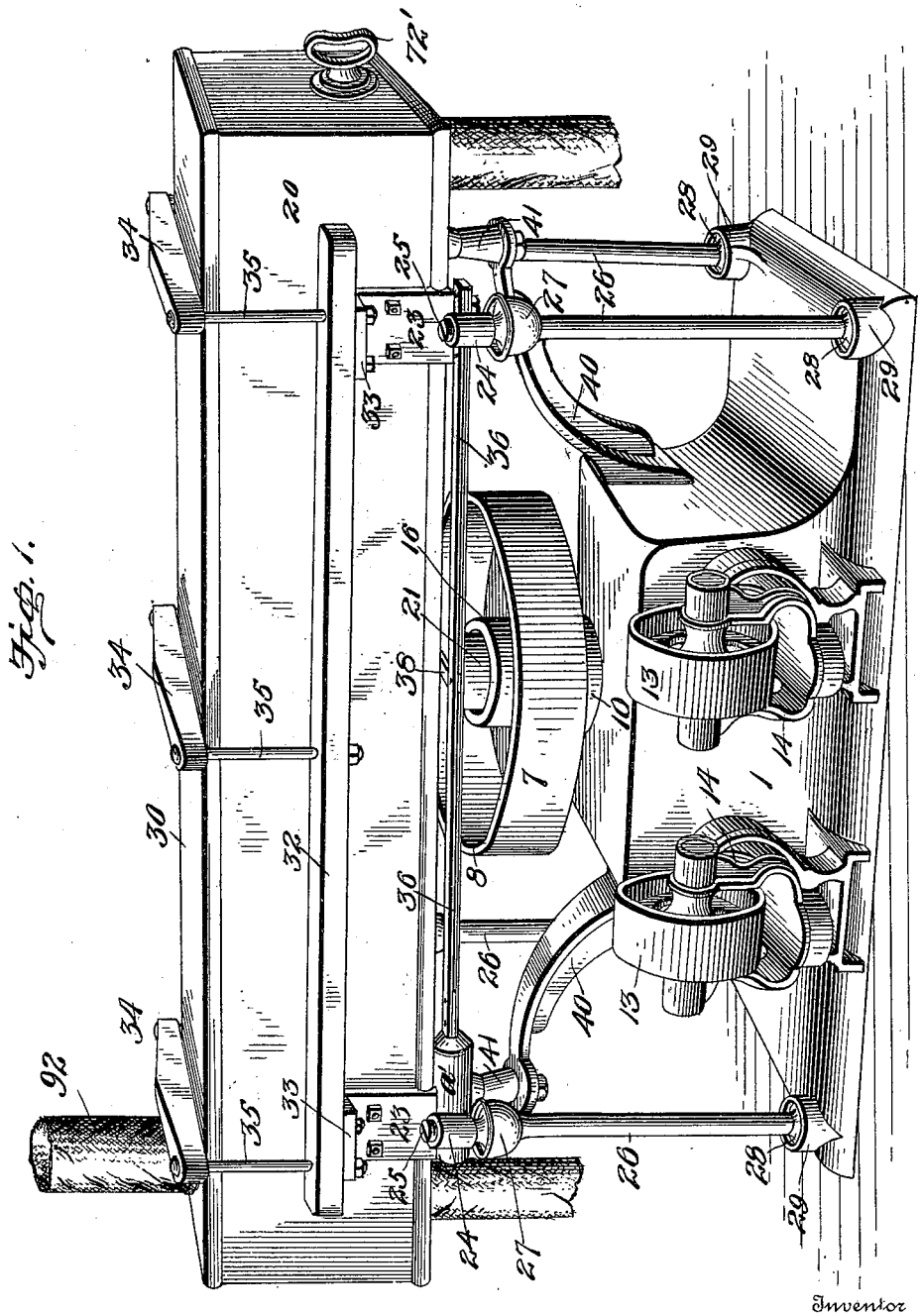
Witnesses
Inventor
F. L. Shaler
by H. B. Willson & Co
Attorneys

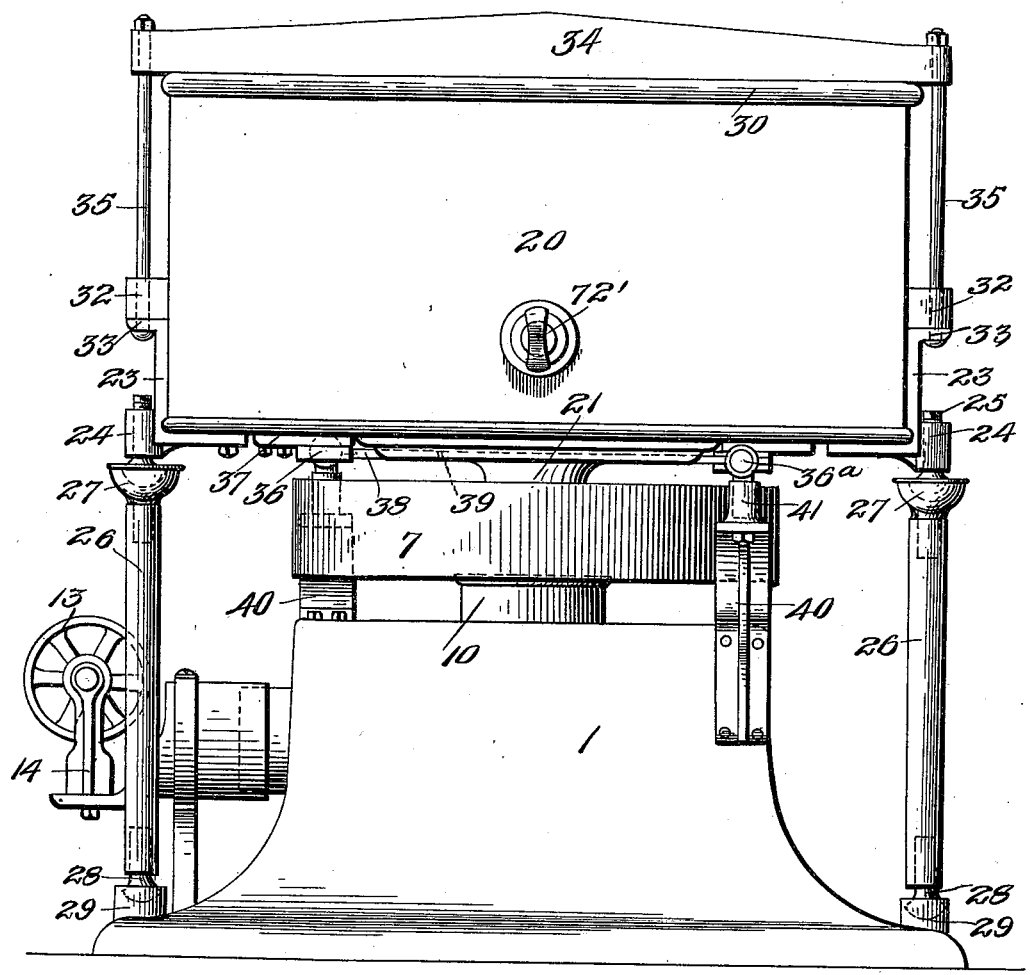

No. 650,693. Patented May 29, 1900.
F. L. SHALER.
GYRATORY BOLTING MACHINE.
(Application filed Nov. 29, 1899.)
(No Model.) 10 Sheets—Sheet 3.
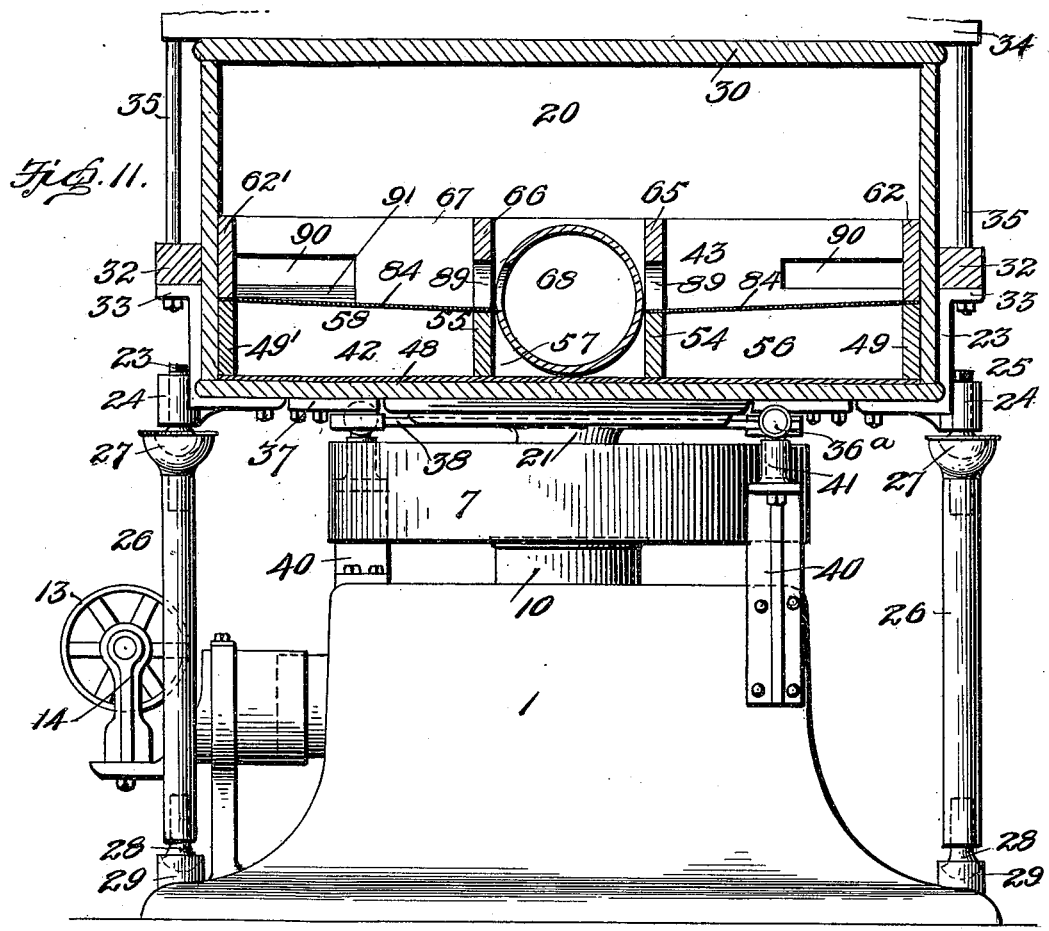
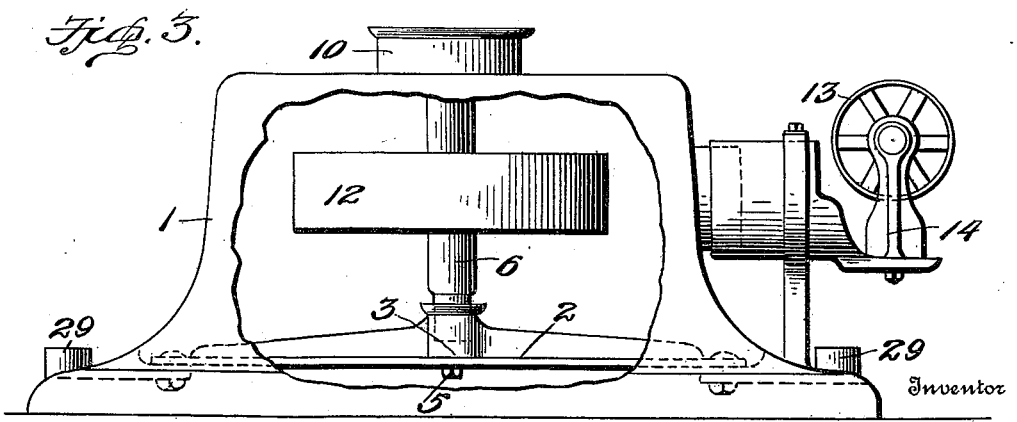

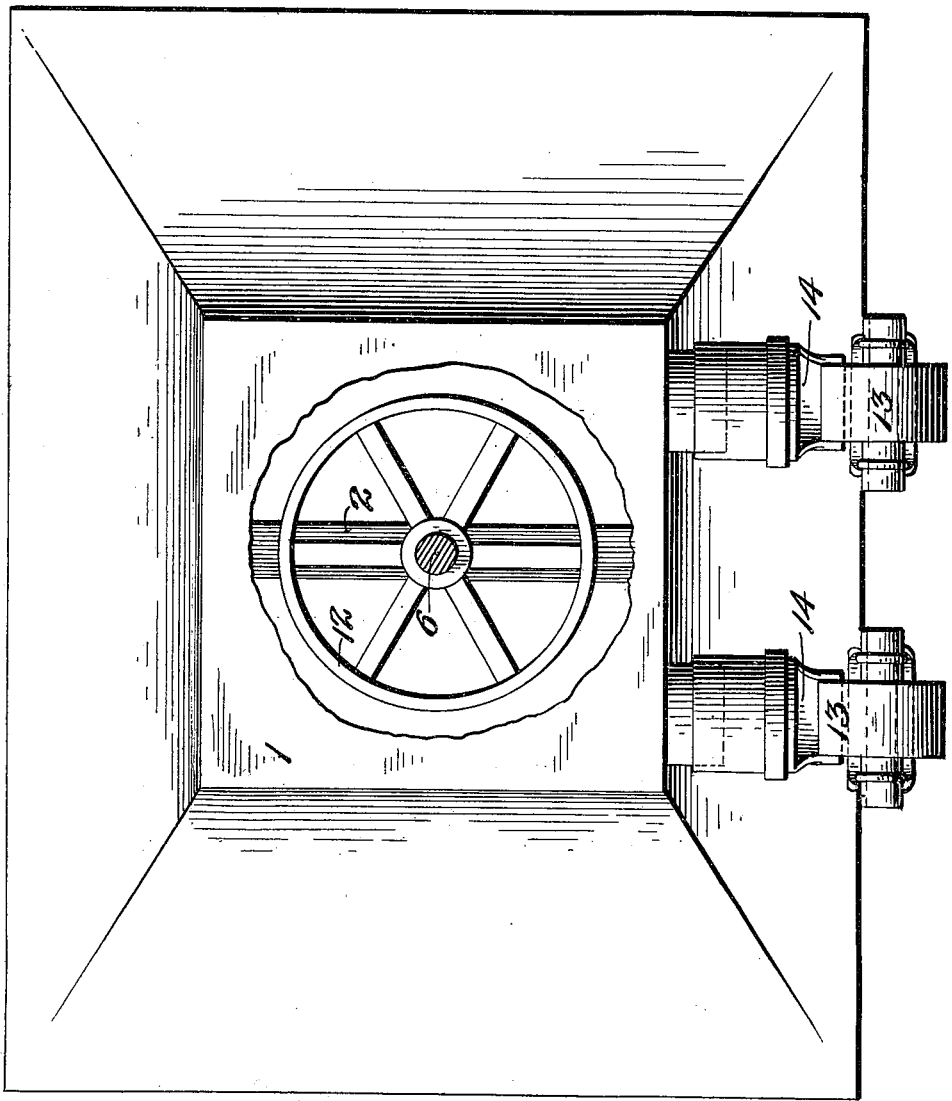

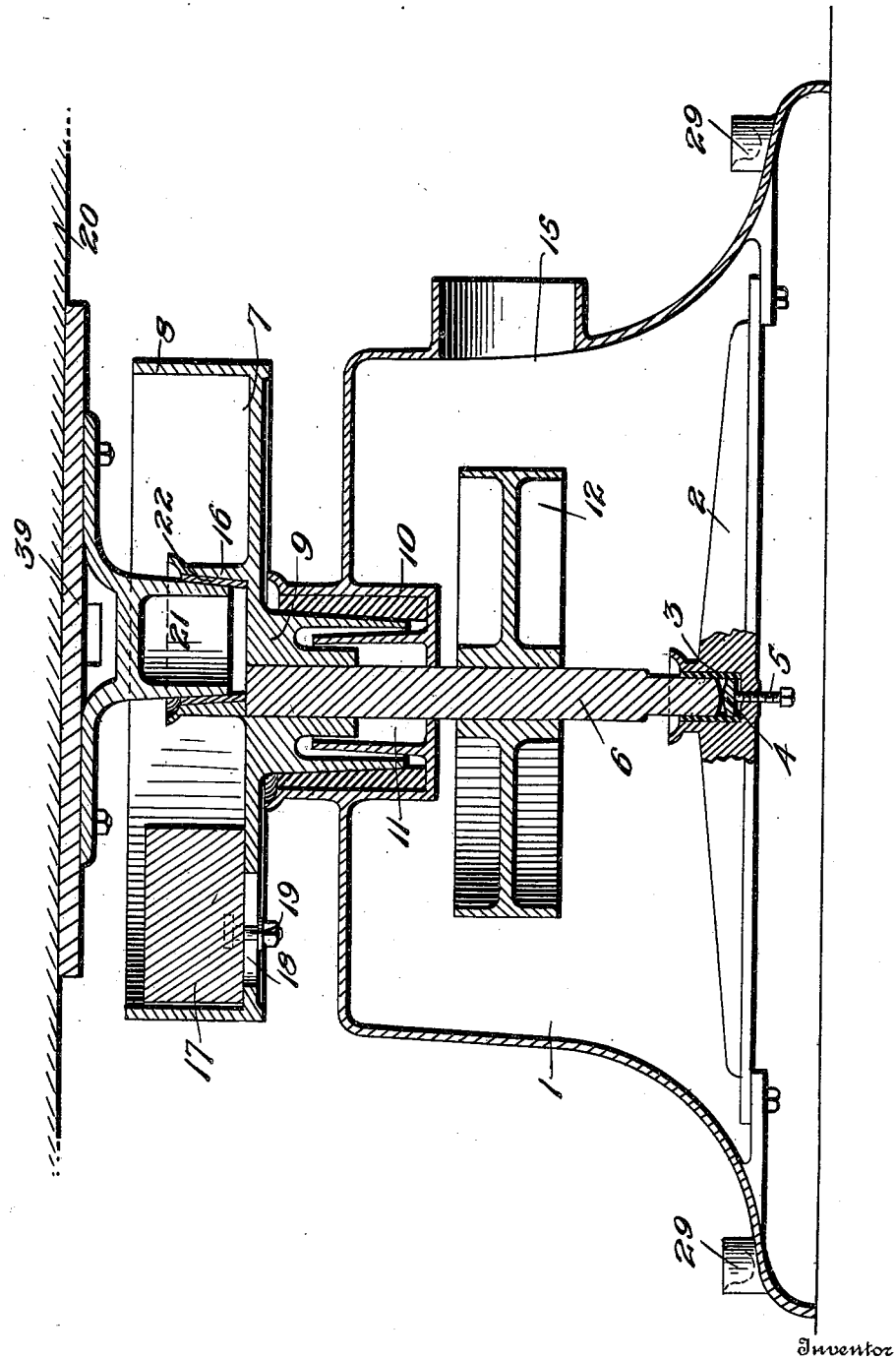

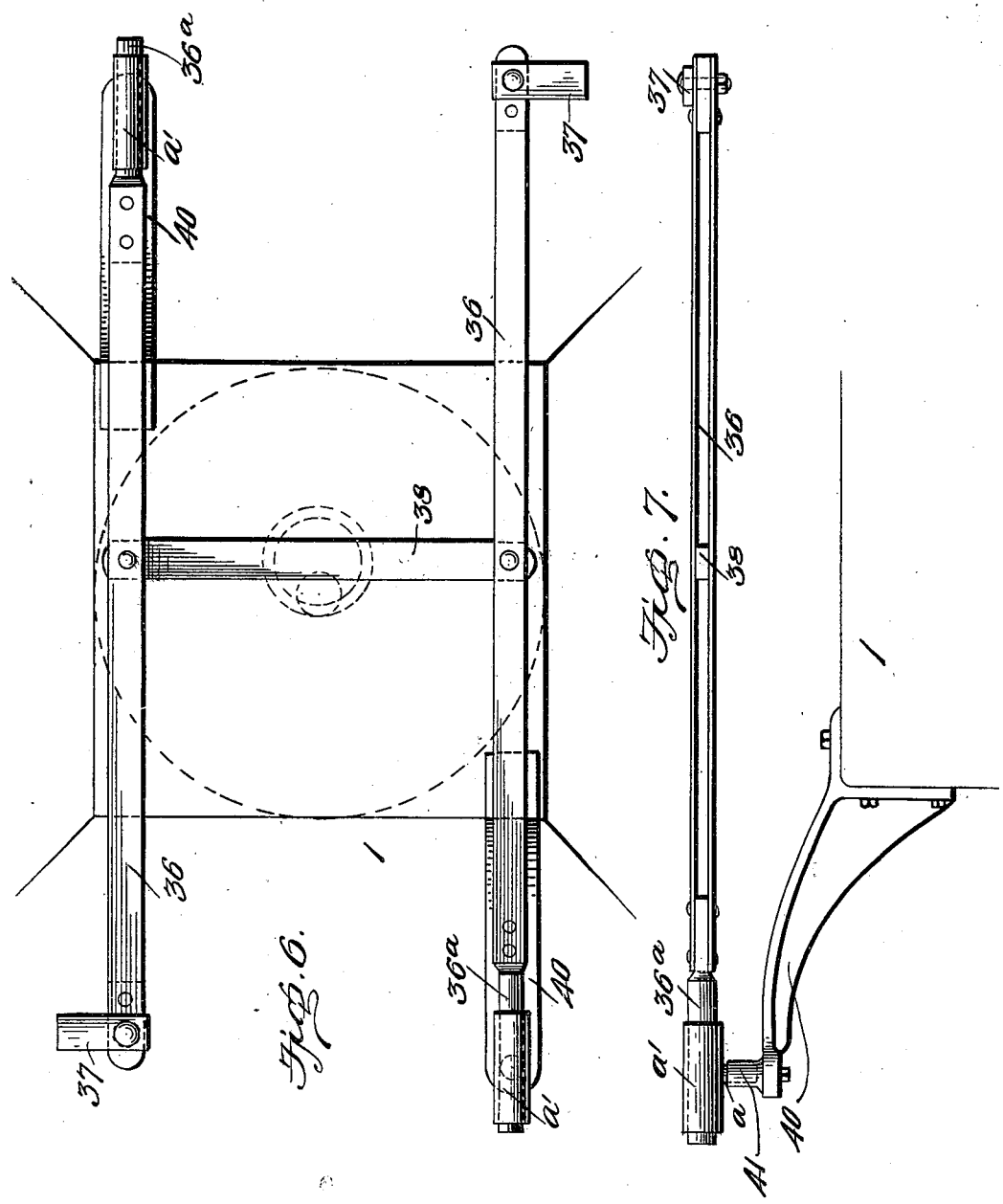

No. 650,693. Patented May 29, 1900.
F. L. SHALER.
GYRATORY BOLTING MACHINE.
(Application filed Nov. 29, 1899.)

(No Model.) 10 Sheets—Sheet 7.

Witnesses
F. L. Shaler,
Inventor by Attorneys

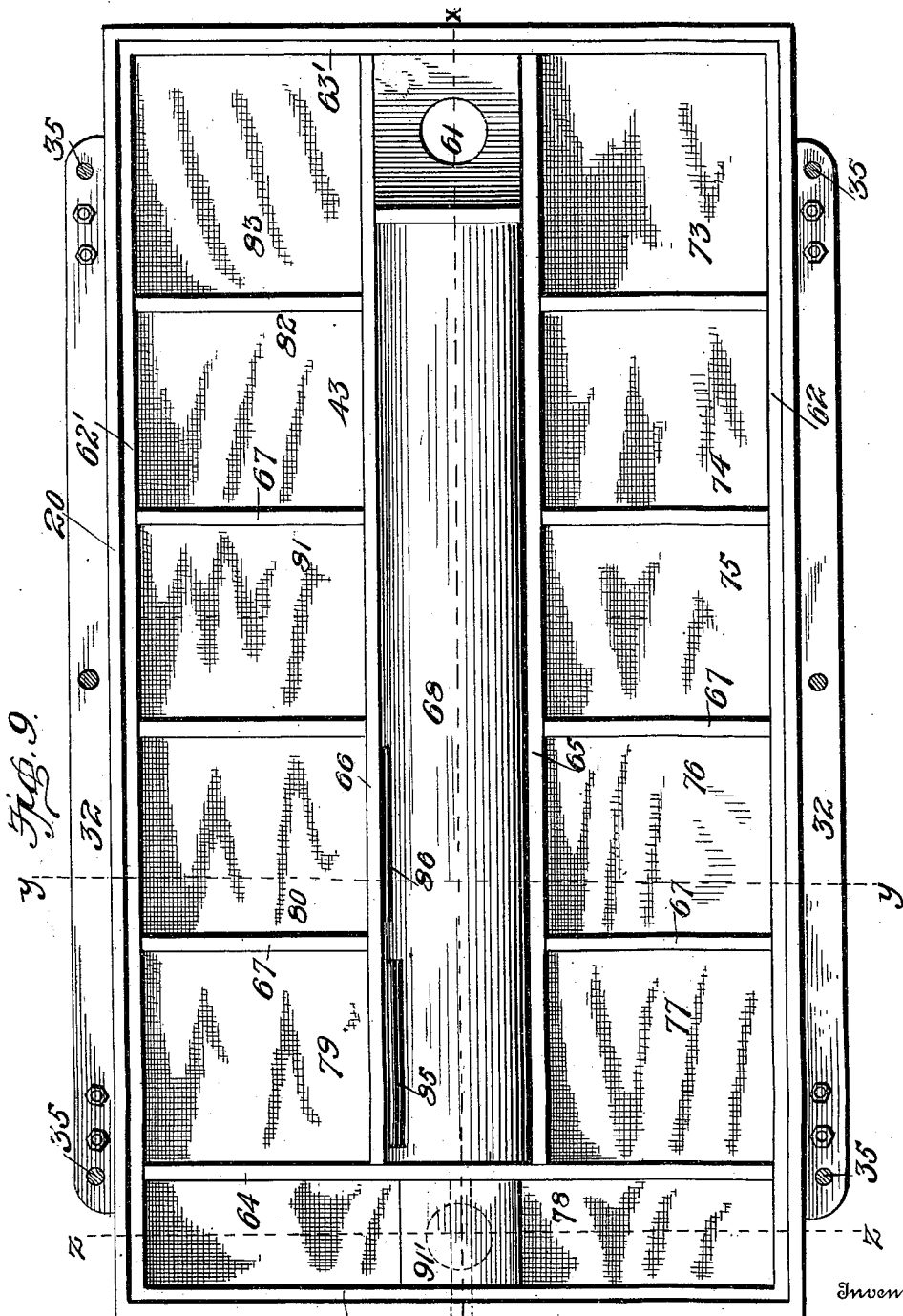

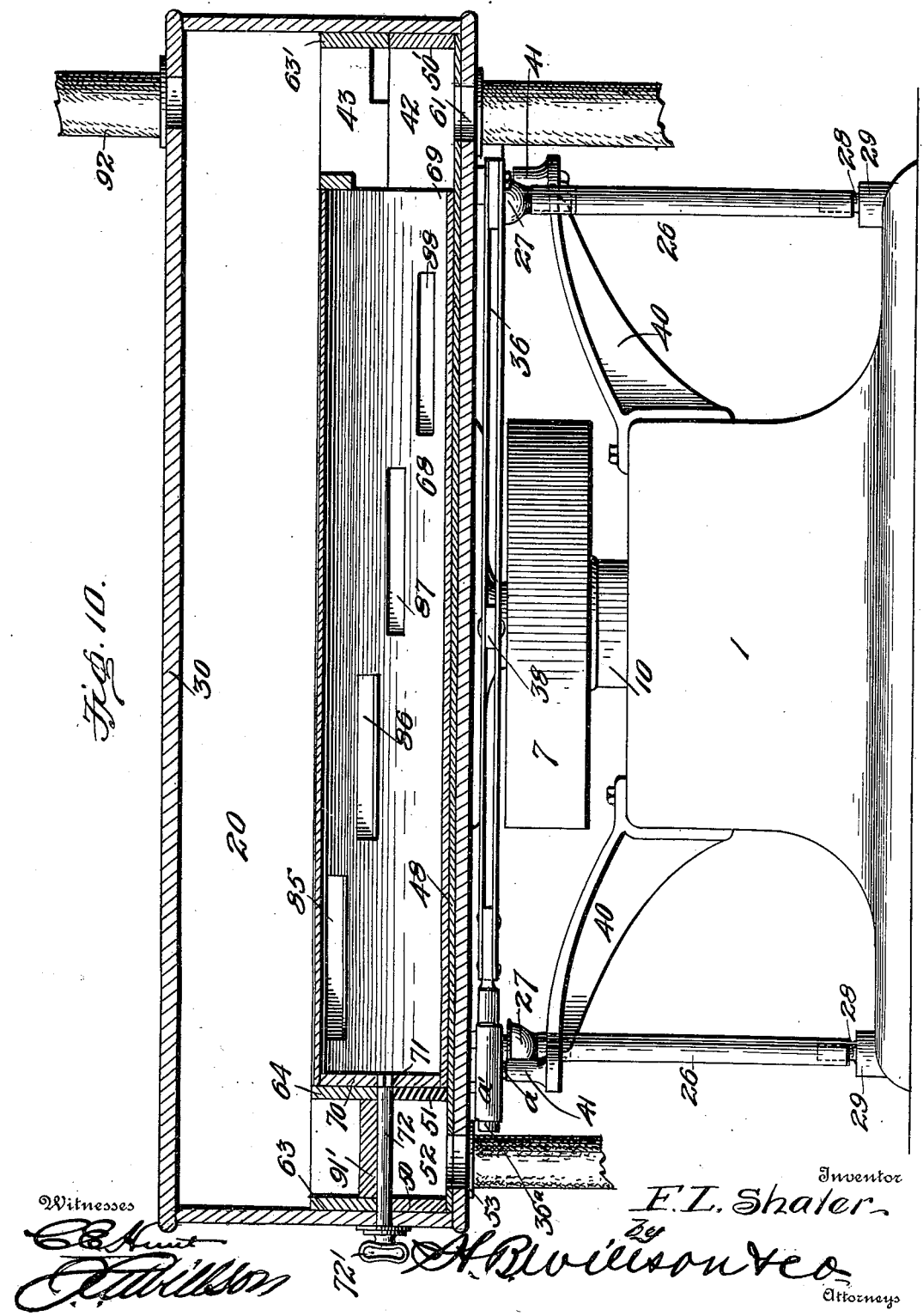

No. 650,693. Patented May 29, 1900.
F. L. SHALER.
GYRATORY BOLTING MACHINE.
(Application filed Nov. 29, 1899.)

(No Model.) 10 Sheets—Sheet 10.

Witnesses

Inventor
F. L. Shaler
by H. B. Willson & Co.
Attorneys

UNITED STATES PATENT OFFICE.

FRANK L. SHALER, OF HEBRON, OHIO.

GYRATORY BOLTING-MACHINE.

SPECIFICATION forming part of Letters Patent No. 650,693, dated May 29, 1900.

Application filed November 29, 1899. Serial No. 738,638. (No model.)

*To all whom it may concern:*

Be it known that I, FRANK L. SHALER, a citizen of the United States, residing at Hebron, in the county of Licking and State of Ohio, have invented certain new and useful Improvements in Gyratory Bolting-Machines; and I do declare the following to be a full, clear, and exact description of the invention, such as will enable others skilled in the art to which it appertains to make and use the same.

The invention relates to improvements in gyratory bolting-machines.

Among the several objects in view one is to provide simple, durable, and positive means for imparting to the bolting-chest a gyrating movement in a horizontal plane, special provision being made for preventing the tilting or canting either endwise or sidewise of the chest in its movement.

With this and other objects in view the invention consists in certain features of construction and combination of parts, which will be hereinafter fully set forth.

Figure 8:
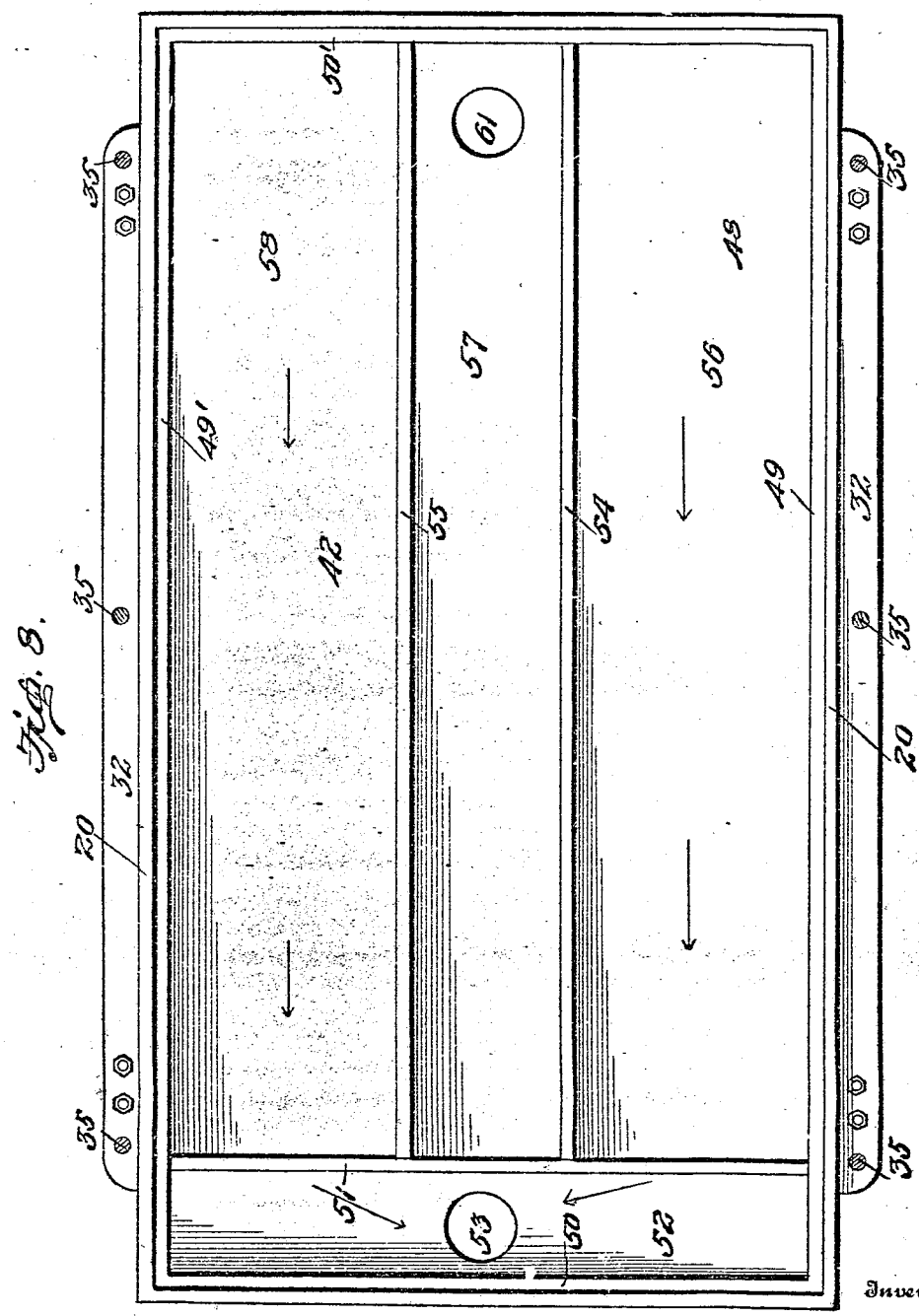
Figure 12:
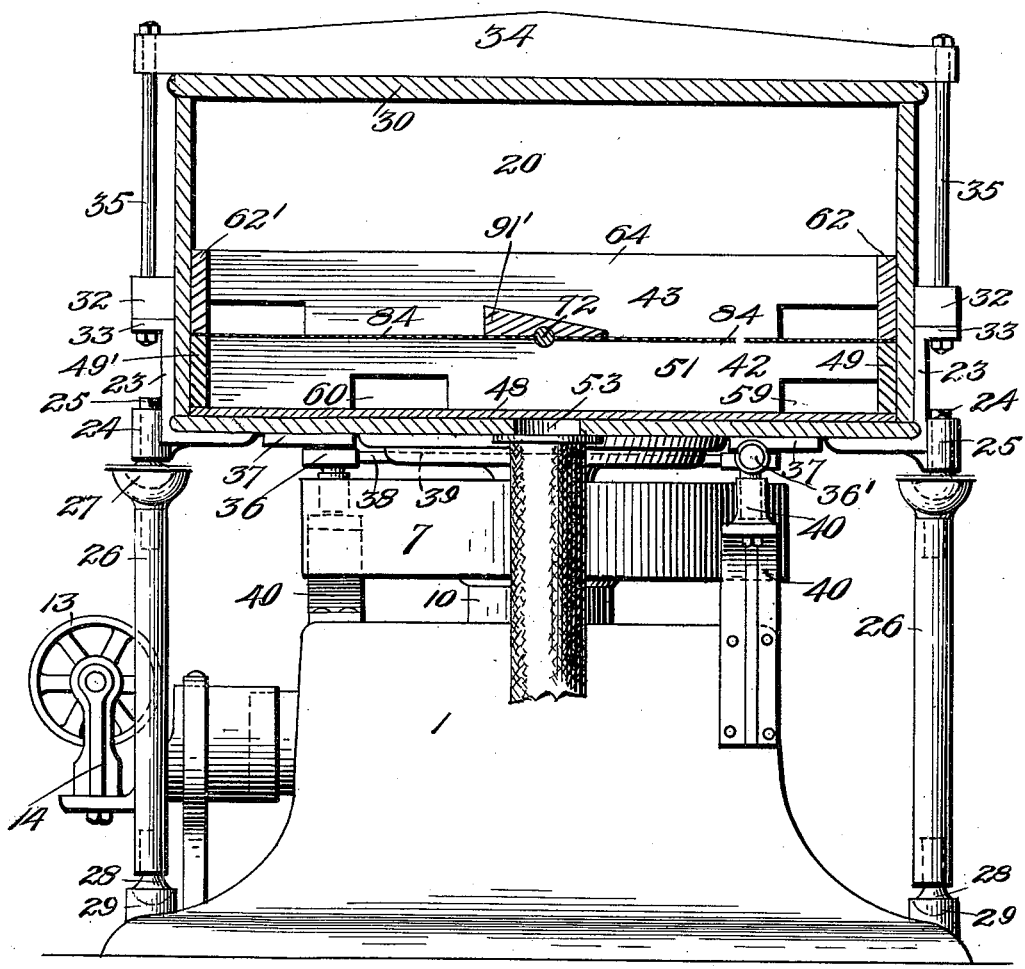

In the accompanying drawings, in which I have shown the preferred embodiment of my invention, Figure 1 is a perspective view taken from the front side of my improved machine. Fig. 2 is an elevation of the front end of the machine. Fig. 3 is a side elevation of the base of the machine and the idle pulleys mounted thereon, the base being broken away to show the parts which it incloses. Fig. 4 is a top plan view of the same parts. Fig. 5 is a longitudinal vertical sectional view taken through a portion of the bottom of the bolting-chest and the base, showing the manner in which the two are connected together. Fig. 6 is a plan view of the equalizing mechanism. Fig. 7 is a side elevation of the same. Fig. 8 is a top plan view of the bolting-chest, the cylindrical conveyer and the upper section of the bolting-frame being removed to more clearly illustrate the lower section. Fig. 9 is a similar view with the cylindrical conveyer and the upper section of the bolting-frame in place. Fig. 10 is a longitudinal sectional view on the line x x of Fig. 9. Fig. 11 is a cross-sectional view on the line y y of Fig. 9. Fig. 12 is a sectional view on the line z z of Fig. 9.

Referring to the drawings, in which the same reference characters indicate the same parts of the invention, 1 denotes the hollow base of the machine, to which is bolted the truss 2, having a stepped bearing 3, in which is located a bearing-washer 4, made adjustable by a set-screw 5.

6 denotes the drive-shaft, the lower end of which is stepped in said bearing and to the upper end of which is fixed a balance-wheel 7. This wheel is provided with an annular flange 8 and with a depending hollow journal-stud 9, which is journaled in a suitably-packed bearing 10 of the base. An oil-cup 11 is secured to or made integral with the bearing 10 and surrounds the drive-shaft.

12 denotes a drive-pulley fixed to the shaft, and 13 denotes idle pulleys mounted in U-shaped brackets 14, swiveled to the base 1 at points opposite the apertures 15 and designed to carry the drive-belt (not shown) in its movement around the drive-pulley and permit of the belt being driven from pulleys located at different points on the line of shafting in the mill.

Secured to the upper face of the balance-wheel and eccentric to its axis is an eccentric box 16, and at a point diametrically opposite the said box and on a line cutting the center of the drive-shaft is arranged a counterbalancing-weight 17, made radially adjustable in a slot 18, formed in the balance-wheel, by a bolt and nut 19.

20 denotes the bolting-chest, to the bottom of which is bolted a stud 21, which is adapted to seat in the eccentric box 16. The stud and eccentric box are correspondingly tapered, and the latter, if desired, may be provided with a suitable packing 22.

23 denotes angular brackets secured to the sides of the bolting-chest near its ends and provided with screw-threaded sleeves 24, in which are arranged screw-threaded bearing-studs 25.

26 denotes four wabbling posts, the upper ends of which are provided with bearing-cups 27 to receive the rounded heads of the bearing-studs 25 and the lower ends of which are provided with bearing-studs 28 to seat in bearing-sockets 29, cast on the base of the machine. These posts support the bolting-chest at its corners in its gyrating movement.

30 denotes the cover of the bolting-chest, and 32 denotes longitudinal bars supported upon the laterally-extending portions 33 of the brackets 23. Clamping-bars 34 are arranged across the top of the bolting-chest and are connected to the longitudinal bars 32 by bolts 35, which clamp the cover firmly in place.

36 denotes equalizing-bars, one end of one equalizing-bar being pivoted to a bracket 37, secured to the bottom of the chest near one end, and the opposite end of the other equalizing-bar being pivoted to a similar bracket 37, secured to the bottom of the chest near its opposite end. 38 denotes a link pivotally connecting said bars intermediate their ends, said link passing through a slot 39, formed in the stud-bearing 21.

40 denotes bracket-arms bolted to the base at diametrically-oblique opposite corners. Bolted to the free ends of each of these arms is a vertically-disposed journal-box 41, which receives the stud-bearing $a$ of the horizontally-disposed bearing-sleeve $a'$, which in turn receives the cylindrical end $36^a$ of the equalizer-bar 36.

From the foregoing description, taken in connection with the accompanying drawings, the construction and advantages of the invention will be readily understood without requiring an extended explanation.

Briefly stated, the operation of the parts hereinbefore described is such that when the shaft 6 is rotated it carries the balance-wheel 7 with it, which in turn imparts a gyrating or radial movement in its horizontal plane to the bolting-chest 20, the sides of the chest being supported by the wabbling standards and the ends by the equalizing-bars, thus causing all the parts of the chest in its gyrating movement to travel in a true horizontal plane.

Having thus described the construction and operation of the mechanism for imparting the gyrating movement to the bolting-chest, I will now proceed to describe the construction of the bolting frame or frames located within said chest. In the beginning it may be well to state that I may arrange as many bolting-frames side by side and one above the other as I desire; but as the construction and operation of one bolting-frame is identically the same as that of a series I have shown only one frame and will now proceed to describe the same, it, however, being understood that I reserve to myself the right to employ as many frames as may be desired, according to the amount of work to be accomplished.

42 43 denote the sections forming one of my improved bolting-frames, which sections are arranged within the chest upon its bottom. The section 42 consists of a bottom 48, fixed to the side and end walls 49 49' and 50 50', respectively, and a transverse partition 51, fixed between the side walls near one end and parallel with the end walls 50' to form a passage-way 52, which is provided with a discharge-orifice 53, extending through the base-board.

54 55 denote longitudinal parallel partitions, which extend from the end walls 50' to the transverse partition 51 and which form the longitudinal parallel passage-ways 56, 57, and 58, the partition 51 being provided with transverse orifices 59 60, which establish communication between the passage-ways 56 58 and the transverse passage 52, the siftings passing from the passages 56 58 in the direction of the arrows, as shown in Fig. 8, while the finished tailings in the middle passage 57 pass in the direction of the arrow through the discharge-orifice 61.

The section 43 of the bolting-frame consists of the side and end walls 62 62' and 63 63', respectively, the transverse partition 64, and the longitudinal partitions 65 66. A series of intermediate partitions 67 67 extend transversely between the side walls 62 62', and an inclined cylindrical conveyer 68 is longitudinally mounted between the partitions 54 55 in the lower section 42 and the corresponding partitions 65 66 in the upper section 43, the lower end 69 of said conveyer communicating with the central passage 57 of the lower section 42, while its raised closed end 70 is formed with an axial rectangular socket 71 to receive the correspondingly-formed contiguous end of a horizontal shaft 72, journaled in one end of the chest and provided with a crank-handle 72' for rotating it. The various partitions in the section 43 divide it into a series of compartments 73, 74, 75, 76, 77, 78, 79, 80, 81, 82, and 83, more or less, as may be desired, and each of which is provided with a bottom formed of bolting-cloth 84, which is inclined downwardly from the outside edges of the section to the center.

85, 86, 87, and 88 denote a series of longitudinal radial openings arranged in different planes in the conveyer 68 and adapted to be alternately alined with one of the openings 89, with which the compartments 74 to 77 and 79 to 82, both inclusive, are provided, the arrangement of the openings in the conveyer being such that when one of them is alined with the corresponding opening in one of the compartments the openings leading from the remaining compartments are closed by the walls of the conveyer. The transverse partitions which form the end walls of the several compartments are each formed with a passage-way 90 in the forwardly and upwardly inclined sill 91 to facilitate the passage of the stock from one compartment to the other and at the same time prevent its retrograde movement when the machine is in operation. The end compartment 78 is also provided with a similarly-formed sill 91' for a like purpose.

The cover of the chest is provided with a hopper 92 to receive the stock after being ground or rolled. From the hopper the stock passes into the head compartment 73 and along through the various sieve-compartments until it is found upon examination to be finished, which we will assume is the case when the tailings have arrived at the compartment, say, 79. This being the case, the cylindrical conveyer is turned by its handle until the opening 85 in said conveyer is brought into alinement with the corresponding opening 89 in the compartment 79, so that the finished tailings will pass into the conveyer and out through its lower end, where it passes out at the discharge-orifice 61, the siftings in the meantime passing through the sieve-bottoms of the compartments and into the passageways 56 58, where they are discharged, as heretofore stated, from the communicating passage-way 52 through the discharge-orifice 53.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. In a machine of the character described, the combination with the drive-shaft, and a balance-wheel fixed thereto and provided with an eccentric box; of a bolting-chest provided with a stud to engage said box, wabbling posts for supporting the sides of said chest, equalizing-bars pivoted at their opposite ends to the bottom of said chest, swiveled bearing-sleeves for receiving the free ends of said bars, and a link pivotally connecting said bars, substantially as and for the purpose set forth.

2. In a machine of the character described, the combination with the base and fixed arms arranged at obliquely-opposite points, a balance-wheel journaled in said base and provided with an eccentric box, and means for rotating the balance-wheel; of a bolting-chest, a stud projecting from the bottom of the bolting-chest and engaging said eccentric box, horizontally-disposed sleeves swiveled to said arms, equalizing-bars pivoted at their opposite ends to the bottom of said chest, a link pivoted to said bars, said bars having their free ends located in said swiveled sleeves, and wabbling posts for supporting said chest at its sides, substantially as and for the purpose set forth.

3. The combination in a horizontal gyrating bolting-chest; of a bolting-frame arranged therein and consisting of an upper and lower section, the latter being provided with a solid bottom having a discharge-orifice, and the former with a bottom formed of bolting-cloth, and a longitudinal conveyer mounted between said sections and provided with a series of orifices adapted to register with a series of corresponding orifices in said upper section, substantially as and for the purpose set forth.

4. The combination in a horizontal gyrating bolting-chest; of a bolting-frame arranged therein and consisting of an upper and lower section, the former being provided with a series of communicating screen-bottom sections having lateral discharge-openings, and a longitudinal conveyer mounted between said sections and provided with a series of orifices adapted to register with the discharge-openings in the screen-sections, and means for rotating said conveyer on its axis to aline any of its orifices with any of the discharge-orifices of the screen-sections, substantially as and for the purpose set forth.

5. The combination with the bolting-chest; of a screen-section secured therein and provided with a row of discharge-orifices, and a longitudinal cylindrical conveyer mounted adjacent said orifices and having unalined orifices any of which is adapted to be brought into alinement with any of the discharge-orifices of said section, the constructions being such that but one orifice of the screen-section and one orifice of the conveyer can register at one time, substantially as and for the purpose set forth.

In testimony whereof I have hereunto set my hand in presence of two subscribing witnesses.

FRANK L. SHALER.

Witnesses:
  W. D. SHALER,
  MARY A. CRAWSHAW.